United States Patent Office 3,664,605
Patented May 23, 1972

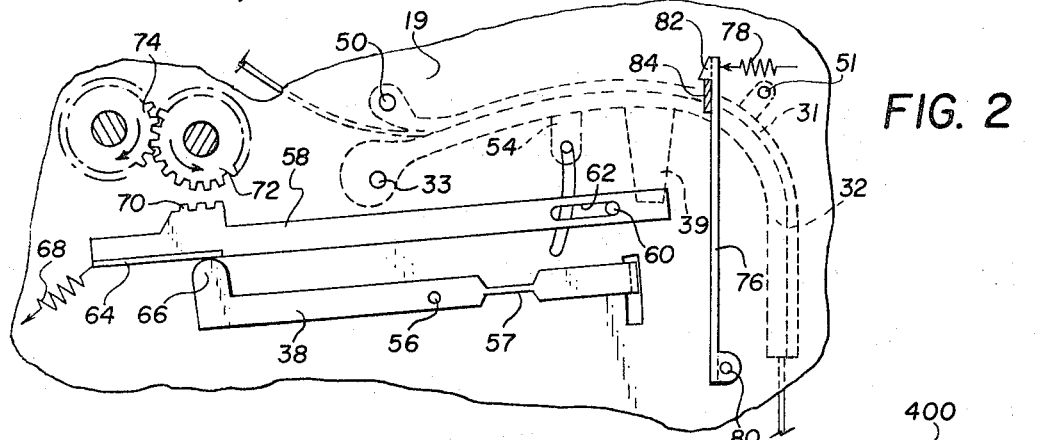
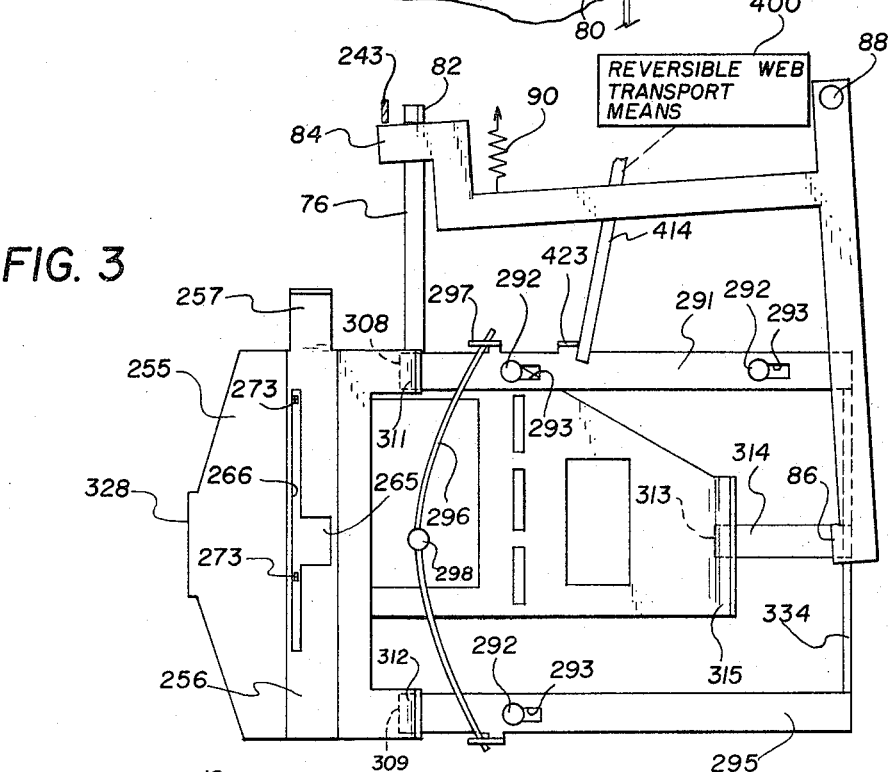
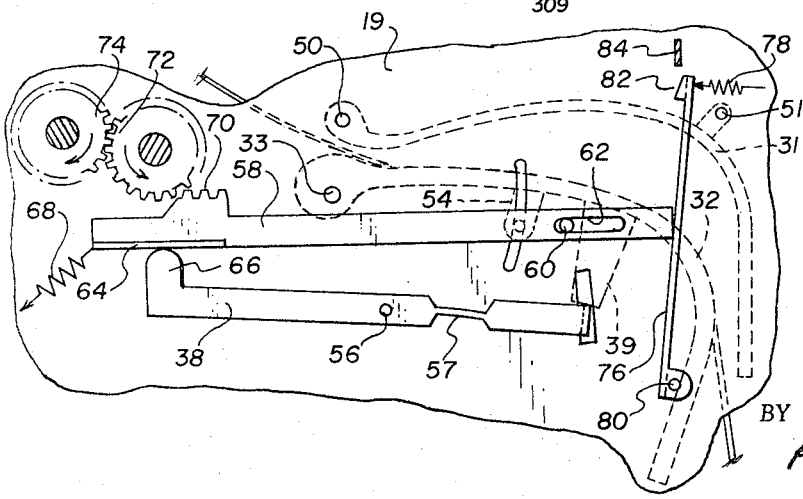

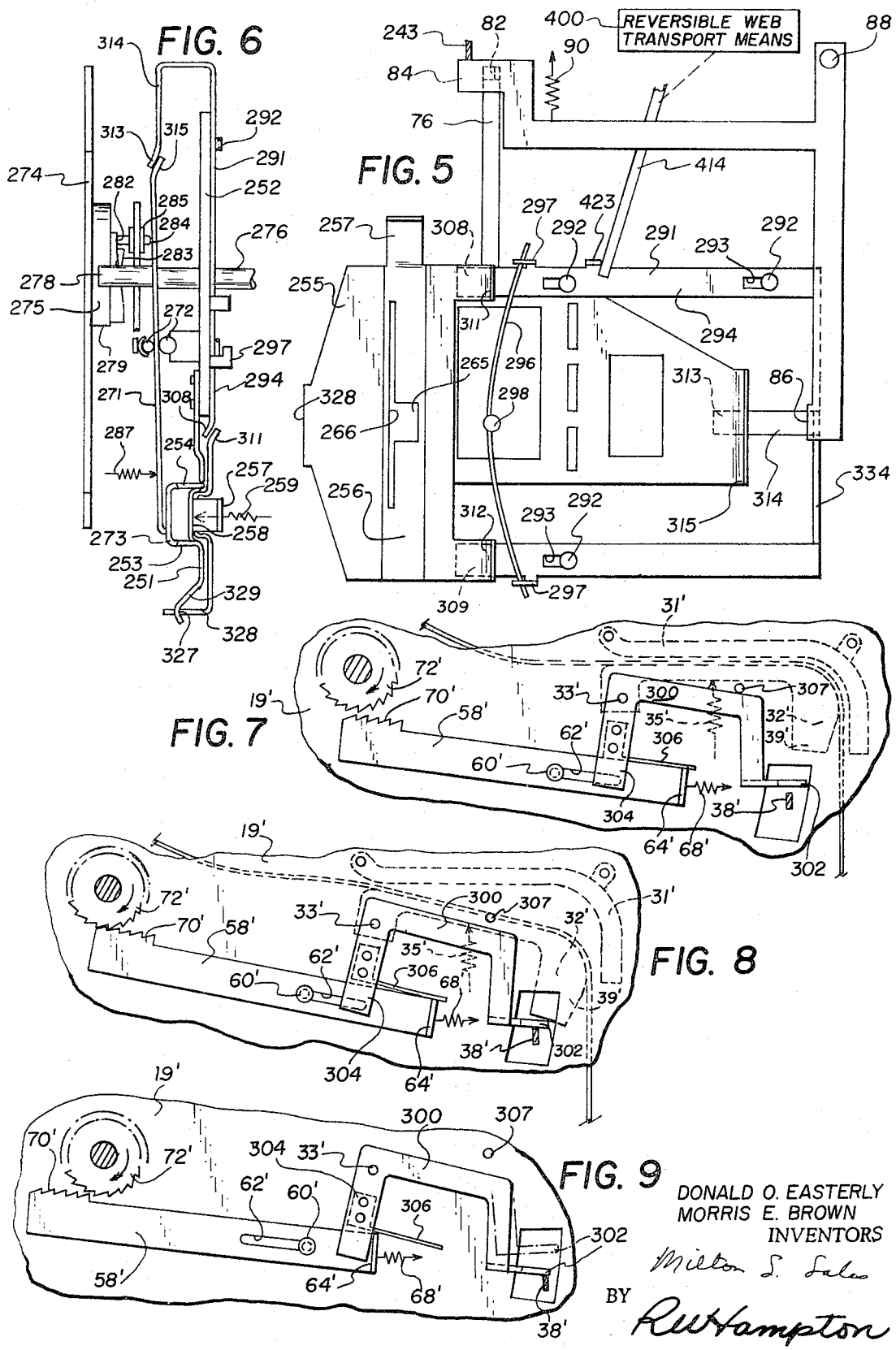

3,664,605
REVERSIBLE WEB TRANSPORTING APPARATUS
Donald O. Easterly, Rush, and Morris E. Brown, Fairport, N.Y., assignors to Eastman Kodak Company, Rochester, N.Y.
Filed Nov. 23, 1970, Ser. No. 91,698
Int. Cl. G03b *1/04;* B65h *25/00*
U.S. Cl. 242—189                          10 Claims

ABSTRACT OF THE DISCLOSURE

A web-handling apparatus having means selectively shiftable between a first condition for transporting a web from a supply roll, through an operating station to a web take-up and a second condition for transporting the web from the take-up through the operating station onto the supply roll. Movable means are provided for shifting the transporting means between its first and second conditions. The movable means is releasably latched in its first condition against a biasing force. Means responsive to an increase in web tension causes a latch release member to engage a source of power to be moved thereby into contact with the latch means to thereby release the latch means and to shift the web transporting means to its second condition.

BACKGROUND OF THE INVENTION

Field of the invention

The present invention relates generally to web handling apparatus, and more specifically to an automatic rewind mechanism for a motion picture projector or the like.

Description of the prior art

In motion picture projectors or the like, the film is normally transported from the supply reel through an operating station (such as an apertured film gate) onto a take-up reel. In such a projector, the apertured film gate is positioned along the optical axis of the projector, and a film pull down claw mechanism is incorporated in the projector for intermittently advancing the film past the aperture one frame at a time for projection. Normally, after the entire length of film has been projected and wound onto the take-up reel, the operator manually connects the trailing end of the film to the supply reel, moves a lever to disconnect the drive system from the take-up reel and connect it to the supply reel, and operates the projector to rewind the projected film from the take-up reel onto the supply reel.

Motion picture projectors have been improved to include apparatus in which a web is transported in one direction for a specified operation such as projection, and after the operation has been completed, the web is automatically reversed in direction and rewound onto the supply reel. Such mechanisms are disclosed in coassigned U.S. Pats. No 3,300,155 in the name of Robert J. Roman and No. 3,468,498 in the name of Leslie J. Bunting. In such projectors, the web is automatically rewound to the supply reel when a mechanism responsive to film tension automatically disengages the film from the pull down claw, withdraws the pressure pad from the film, and disconnects the drive system from the take-up reel and connects it to the supply reel. A force derived directly from the increased film tension between the supply reel and the gate is used to release a latch that in turn allows stored energy to release the pressure pad and side guides, retract the pull-down claw, disengage the take-up drive and engage the positive rewind drive. To avoid damaged film perforations or failure to engage the rewind due to reverse film motion in the gate, the latch trip force felt by the film should be kept to a minimum. However, when the trip force is kept low, the machine is subject to premature rewind due to temporary increases in film tension such as are caused by starting the projector from "still" with heavy reels or pulsations due to out-of-balance reels or film contact with the reel flanges. For most reliable operation, the rewind trip mechanism should require very low film tension, yet be able to detect a false rewind signal.

SUMMARY OF THE INVENTION

It is an object of the present invention to provide a web handling apparatus having means selectively shiftable between a first condition for transporting a web through an operating station in one direction and a second condition for transporting a web through the operation station in another direction with means for shifting the transporting means between these conditions by means of a rewind trip mechanism which is sensitive to very low changes in web tension and yet is able to differentiate between real and false rewind signals.

In accordance with the above object, a preferred embodiment of the present invention includes movable means for shifting the web transporting means between its first and second conditions, means biasing the movable means in a direction to shift the web transport means to its second condition, and latch means releasably coupled to the movable means for holding the movable means against the force of the biasing means. A mechanism for releasing the latch means to permit shifting of the transport means from its first to its second condition includes sensing means engageable with the web for detecting changes in web tension, a source of mechanical power and a latch release member movable into coupled engagement with the power source in response to the detection of a change in web tension by the sensing means so that the latch release member is driven by the power source into contact with the latch means to effect release of the latch means. If a false signal is detected, the latch release member will be moved away from the power means before the latch means is released.

The invention, and its objects and advantages, will become apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 2 is a side elevational view of the film tension sensing device and latch release mechanism of the projector shown in FIG. 1;

FIG. 3 is a front elevational view of the film pull down mechanism and the actuating device employed to open and close the film gate and to adjust the film winding and rewinding mechanism at appropriate times during the operation of the projector showing the relative positions of the illustrated components when the film gate is in a closed condition;

FIG. 4 is a side elevational view similar to FIG. 2 showing the latch release mechanism in a position for automatically rewinding the projected film onto the supply reel;

FIG. 5 corresponds to FIG. 3 and depicts the relative positions of the illustrated components when the film gate is in an open condition;

FIG. 6 is a somewhat schematic top plan view of a portion of the structure shown in FIG. 3;

FIGS. 7, 8 and 9 are side elevational views of the film tension sensing device and latch release mechanism constructed in accordance with another embodiment of the present invention, showing sequentially the projector in its stages of operation.

DESCRIPTION OF THE PREFERRED EMBODIMENTS

Figure 1:
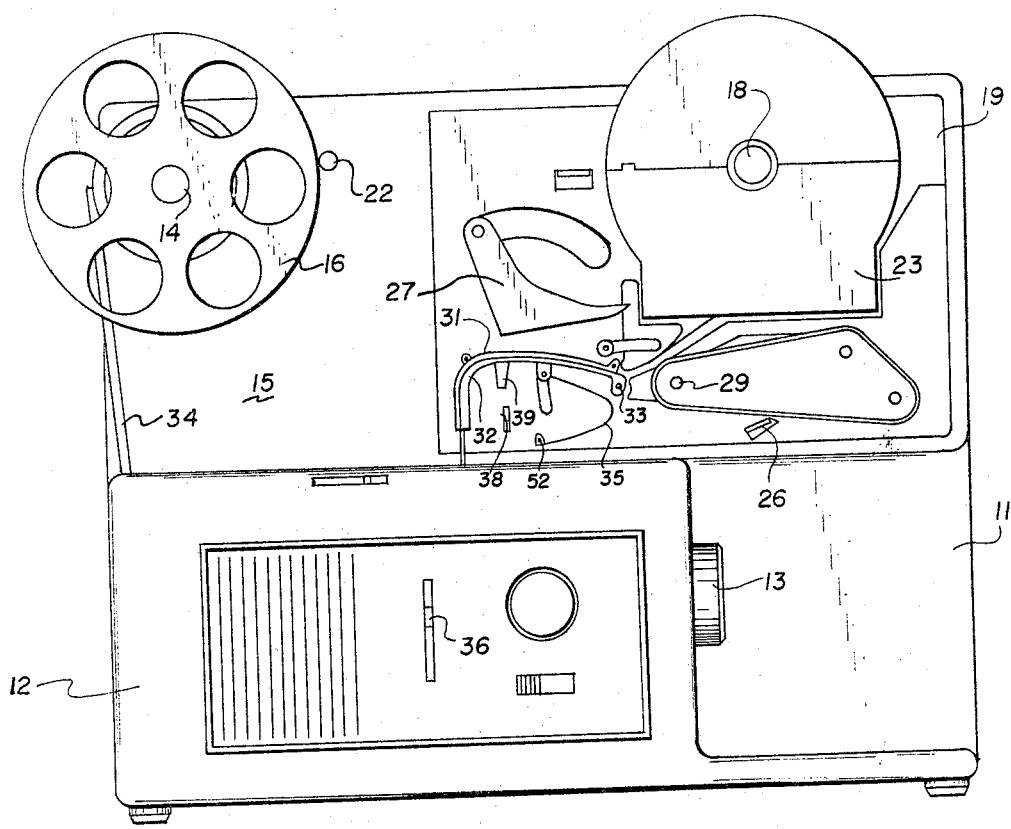
FIG. 1 is a side elevational view of a motion picture projector having incorporated therein an automatic rewinding mechanism constructed in accordance with the present invention, and showing the projector in a normal projecting mode with portions thereof omitted for purposes of clarity.

Because motion picture projectors are well known, the present description will be directed in particular to elements forming part of, or cooperating more directly with apparatus in accordance with the present invention. It is to be understood that projector elements not specifically shown or described may take various forms well known to those skilled in the art.

Referring to the drawings, two preferred embodiments of an automatic rewinding mechanism according to the present invention are disclosed for use in a motion picture projector such as for example that shown in coassigned U.S. Pat. No. 3,468,498 in the name of Lesile J. Bunting. Such a projector is shown in FIG. 1 and comprises a generally rectilinear casing member 11 including a housing 12 which extends laterally towards the right side of the projector and supports a forwardly facing projection lens assembly 13. To simplify subsequent explanations of the projector apparatus, the side of the projector shown in FIG. 1 will be referred to throughout the following disclosure as the right side and references to right or left movement of laterally movable projector elements will be made in the same sense unless otherwise specified. Correspondingly, the terms "front" and "back" and "forward" and "rearward" will be used throughout the disclosure with reference to the front and back of the projector as shown to the right and left, respectively, in FIG. 1. Similarly, references to clockwise or counterclockwise rotation of various elements of the projector mechanism will be made from the viewpoint of the drawing being referred to at that point of the disclosure.

Above housing 12, rotatable take-up reel spindle 14 extends beyond a vertical wall members 15 in coaxial alignment with a corresponding pulley member, not shown, which rotates constantly in a clockwise direction during operation of the projector. Spindle 14 is adapted to receive a film take-up reel. A similar spindle 18 likewise, extends beyond wall member 15 through a mechanism plate 19 in coaxial alignment with another pulley member, not shown, which is constantly rotated in a clockwise rotation. Spindle 18 is adapted to receive a film reel housed within a cartridge 23 loaded onto the projector as shown.

To operate the projector, the film cartridge is moved laterally into its illustrated position adjacent the mechanism plate, where it is releasably latched in place with the reel in coaxial driving engagement with spindle 18. During this phase of the projector's operating cycle, spindle 18 is positively connected to the corresponding pulley member so that the supply reel is rotated in a counterclockwise direction, tending to maintain the film in a tightly wound condition thereon.

The film stripping operation of the projector is described in U.S. Pat. No. 3,468,498. Briefly, the operator manually depresses an ear 26 to a position in which it is releasably retained by a latch mechanism. This causes a finger 27 to enter the base portion of cartridge 23 and thereafter moves a belt member 28 in a counterclockwise direction about a shaft 29 to bring a belt 30 into contact with the periphery of the roll of film on the film supply reel. Concurrently, spindle 18 is released from driving connection with the rotating pulley member so that the cartridge film spool can rotate freely. Correspondingly, spindle 14 is coupled to its pulley member through a tendency drive adapted to slip under a torque load proportional to the weight of the take-up reel, as determined partially by the amount of film wound thereon.

As the leading end of the film emerges beyond the path defined between the belt and the finger, it enters a curved guide channel established between a stationary film guide member 31 and movable snubber member 32, the snubber member being pivotable downwardly about a pin 33 but biased temporarily into film resilient engagement with the guide member during the stripping and threading operation. This curved guide channel directs the leading end of the film downwardly into engagement by the film advancing mechanism of the projector, whereby it is advanced intermittently past a projection position or operating station aligned with the projector's optical system. Beyond the operating station, the leading end of the film proceeds into a pivotally supported channel member 34 which delivers it into contact with the hub of take-up reel 16. As is well known in the projector art, the hub of the take-up reel is provided with a plurality of teeth adapted to engage the edge perforations in the film, whereby the film is automatically attached to the hub upon being brought into contact therewith.

When the film has been engaged by the film advancing mechanism, its presence at a predetermined location is detected by an appropriate sensing device which then allows ear 26 to return to its initial position, thereby initiating the projection phase of the operating cycle. This causes finger 27 and belt member 28 to retract from the cartridge to their respective positions shown in FIG. 1 and releases snubber member 32 for its downward pivotable movement about pin 33 against the influence of a leaf spring 35, so that the snubber thereafter serves to stabilize the film tension between the operating station and the supply reel in a manner well known in the art.

The inner end of the roll of film on the film supply reel within cartridge 23 is attached to the core of the spool. Therefore, when all of the available film has been unwound from the cartridge, the resulting tightening of the film between the operating station and the reel causes snubber member 32 to pivot downwardly to a position in which a trigger lever 38 is engaged and depressed by a shoe member 39 on the snubber member. Thus snubber member 32 acts as a sensing means for detecting changes in the tension of the film. Such depression of the trigger member initiates the rewind phase of the projector's operating cycle by opening the film gate at the operating station and by withdrawing the film pulldown claw therefrom, by reestablishing positive rewinding rotation of reel spindle 18, and by releasing spindle 14 from the corresponding pulley member to allow take-up reel 16 to rotate freely as film is unwound therefrom. Thus, the film is automatically rewound entirely into the cartridge through the film gate whereupon the rewound cartridge can be removed from the projector.

The mechanism thus far described, and other features of the prior art, may be seen in above mentioned U.S. Pat. No. 3,468,498. Referring to FIG. 2, it will be seen that film guide member 31 is rigidly attached to the exterior surface of mechanism plate 19 by a pair of rivets 50 and 51, and snubber member 32 is attached to the mechanism plate by pivot pin 33. The respective lower and upper surfaces of the guide member and snubber member cooperate to define a film guide passageway when the snubber member is pivoted upwardly against the guide member, as illustrated.

Leaf spring 35 (FIG. 1) is attached to the mechanism plate by a rivet 52 and bears upwardly against a lug 54 on the snubber member to resiliently urge the snubber member to its depicted position adjacent guide member 31. Thus, during the projection of the film, the snubber member serves to stabilize the tension of the portion of film between the film gate and the supply reel or spool by moving downwardly against the influence of spring 35 in response to momentary increases in such tension; similar devices being well known in the projector art. Shoe member 39 extends downwardly from the snubber member above trigger lever 38. The purpose of the shoe member is to depress the trigger lever to initiate the film rewinding phase of operation when the snubber member is moved to its lowermost position by the increase in film tension accompanying withdrawal of all the available film from the film cartridge loaded on the projector.

Trigger lever 38 is pivoted on a stationary stud 56 and has a resilient portion 57. A latch release member in the form of a rack 58 is slidably and rotatably mounted above trigger lever 38 on a pin 60 which rides within a slot 62. The left end of rack 58 has a bent flange portion 64 which contacts a tab 66 on the left end of trigger lever 38. A spring 68 biases rack 58 leftwardly and downwardly as viewed in FIG. 2. The upper edge of the left end of rack 58 is provided with gear teeth 70 adapted for displacement into and out of meshing engagement with a source of mechanical power such as a driven gear or pinion 72. Pinion 72 is constantly rotated in a counterclockwise direction by a gear 74 coupled to a motor, not shown. Gear 74 may be carried by shaft 29 (FIG. 1).

The right end of rack 58 is aligned with a latching bar 76 which is biased by a spring 78 for counterclockwise rotation about a stud 80. The upper end of latching bar 76 is provided with a tab 82 for engagement with a cocking arm 84.

The apparatus employed to open the film gate during rewinding operation is shown in FIGS. 3, 5 and 6. The film gate comprises a stationary gate member 251 rigidly supported by a vertical support plate 252 and defining a vertical channel structure 253 extending downwardly from a rearwardly sloped film guide lip 254. A movable gate member 255 includes a channel portion 256 extending downwardly from a forwardly sloped film guide lip 257 and adapted to mate loosely within channel structure 253 to define a vertical film passageway shown at 258 in FIG. 6. Except during the rewinding operation, the film within this passageway is resiliently sandwiched between the surfaces of the gate members adjacent thereto under the influence of springs 259, which bias the movable gate member in a rearward direction. The film gate is positioned with diverging film guide lips 254 and 257 located directly below the lower end of the guide channel defined between film guide member 31 and snubber member 32 so that the leading end of the film emerging from that channel during the film threading operation is guided into passageway 258 between the gate members.

A projection aperture 265 is provided in the movable gate member along the film passageway and merges into a vertical claw receiving slot 266, extending above and below the aperture. Corresponding aligned openings, not shown, are of course also provided in the stationary gate member, thereby defining a film projection or operating station along the axis of the projector's optical system.

The film advancing mechanism includes a claw plate 271 mounted to support plate 252 between ball bearings shown at 272, which provide for vertically oriented up and down movement of the claw plate while also defining a vertical pivot axis about which a pair of film claws 273 can move into or out of the claw receiving slots in the gate members. Behind the claw plate, a rotary shutter blade 274 and a cam member 275 are attached to the shaft 276 of a drive motor, not shown. A cam follower roller 278 projects rearwardly from the claw plate and is urged downwardly into contact with the peripheral cam surface 279 of the cam member by a spring, not shown, whereby that cam surface imparts predetermined vertical movement to the claw plate. The face of the cam member is provided with two concentric cam surfaces 282 and 283, of different configurations. A cam follower pin 284, slidably supported by a bushing 285 in control lever 36 is adapted to be aligned selectively with either of the two cam surfaces by moving an externally accessible end 36 (FIG. 1) of a control lever to either its raised or lowered position. The flat rearwardly facing surface of the claw plate adjacent the front end of the cam follower pin is rocked rearwardly into resilient contact with the pin by spring 287. Accordingly, the rotation of the cam member causes claws 273 to move both vertically and into and out of engagement with the perforations in the film within the gate passageway. By virtue of the configurations and phase relationship of cam surfaces 279, 282 and 283, movement of the control lever to its raised position causes the film to be advanced downwardly through the gate for normal projection, whereas moving the lever to its lower position causes the film to be shown in reverse as it is moved upwardly through the gate by the claws.

During the rewind operation, the film is rewound into the film cartridge through the film gate. Therefore, it is essential that the gate be open during this operation, i.e. that the film claws be retracted and that the movable gate member be moved out of intimate resilient contact with the film. For this purpose, a cam finger member 291 is mounted to support plate 252 by studs 292 extending through corresponding slots 293 in fingers 294 and 295, thereby allowing lateral movement of the cam finger member between its retracted position shown in FIG. 3 and its operative position shown in FIG. 5. The cam finger member is biased towards its operative position by a spring wire 296 extending between finger ears 297 and bowed about a stationary pin 298 attached to the vertical support plate.

Except during rewind operation, cam finger member 291 is retained in its retracted position shown in FIG. 3 against the influence of spring wire 296 by a cocking arm 84 which has a tab 86 engageable with a connector bar 334 on the cam finger member. Cocking arm 84 is pivotally supported by a fixed stud 88 and is urged by a light spring 90 in a clockwise direction. Cocking arm 84 is normally held in the position shown in FIG. 3 by tab 82 on latching bar 76 (also shown in FIG. 2). As long as cam finger member 291 remains in its retracted position, the rearwardly slanted cam tongues 308 and 309 at the end of fingers 294 and 295, respectively, are in spaced parallel relation to corresponding forwardly slanted tongues 311 and 312 of the movable gate member, but are not in contact with the latter tongues. Similarly, rearwardly slanted tongue 313 at the end of claw disabling finger 314 of the cam finger member is positioned in adjacent parallel relation of the corresponding sloped edge portion 315 of claw plate 271, beyond engagement therewith.

Referring now to FIG. 4, when trigger lever 38 is depressed by shoe member 39 to initiate the film rewinding phase of operation (when the snubber member is moved to its lowermost position by the increase in film tension accompanying withdrawal of all of the available film from the film cartridge), the resulting clockwise movement of the trigger lever about stud 56 lifts the left end of latch release member 58 to engage gear teeth 70 with pinion 72, whereupon movement of rack 58 to the right is initiated. Because spring 35 is weak, the force applied to trigger lever 38 to engage the rack and pinion is kept quite low to avoid damaged perforations or failure to engage rewind due to reverse film motion in the gate. Additional travel of snubber member 32 is permitted by resilient portion 57 of lever 38. Therefore, situations will occur when temporary increases in the film tension for reasons set forth hereinbefore cause engagement of the gear teeth 70 and the pinion. By providing a suitable clearance between the right end of release member 58 and latching bar 76, a time delay is acquired after the rack and gear are engaged but before the release member contacts the latching bar. During this time delay, if the force from the film on the snubber is relieved because the signal was temporary and therefore false, trigger lever 58 will be permitted to rotate in a counterclockwise direction under the bias of spring 68 to disengage teeth 70 from pinion 72 and return the rack to its normal (FIG. 2) position, whereupon the procedure leading to rewind operation is canceled.

If the film tension is caused by withdrawal of all of the available film from the cartridge, pinion 72 will continue to drive rack 58 toward latching bar 76 until the latching bar has been pushed against the force of spring 78 to release cocking arm 84 from engagement with tab 82. Spring 35 is not sufficiently strong to cause the film to move backwards in the gate when the claw is withdrawn from the film sprocket holes. It will be noted that the only force required of the film is the relatively slight force required to lift rack 58 into engagement with pinion 72. The pinion may be driven by the main projector motor and develops sufficient force to release the cocking arm from the latching bar tab.

When cocking arm 84 is disengaged from latching bar 86, spring 90 immediately moves the cocking arm in a clockwise direction about stud 88 to withdraw tab 86 from connector bar 334, whereupon cam finger member 291 is moved by spring wire 296 to its position shown in FIG. 5. Accordingly, the forward displacement of gate member tongues 311 and 312 by finger tongues 308 and 309 pivots the movable gate member forwardly about a vertical axis defined by the engagement of fulcrum edges 327 of movable gate ear 328 with the adjacent concave surfaces 329 of the stationary gate member, thereby moving the channel portion of the movable gate member out of its intimate contact with the film in the gate. Concurrently, tongue 313 at the end of claw disabling finger 314 displaces the sloped edge portion 315 of the claw member forwardly to a position at which claws 273 are entirely retracted from the film gate passageway regardless of the rotational position of cam member 275. While the cam finger member remains in its position shown in FIG. 5, therefore, the film gate remains open to allow free movement of the film therethrough. In addition, a movable film edge guide member of a type known in the projector art obviously could also be retracted in response to such movement of the cam finger member, to thereby increase the width of the film passageway during the rewinding operation.

As long as the various components shown in FIG. 3 are disposed as represented in that figure, the web transport means which is schematically shown in FIG. 3 at 400 is maintained in the condition in which the supply reel is freely rotatable while the take-up reel is frictionally driven in a winding direction to absorb the film delivered through the gate by the pull down claw. To cause the transport means to be shifted so that the supply reel is driven positively in a rewinding direction while the take-up reel rotates freely, the projector is provided with a shift mechanism such as the one described in commonly assigned U.S. Pat. No. 3,468,498. This mechanism includes a rewind shifter bar, a portion of which is shown at 414. The lower end of operating rod 414 is held against the influence of a spring, not shown, by an ear 423 of retracted cam finger member 291. When cam finger member 291 moves to the left as depicted in FIG. 5, operating rod 414 is permitted to move leftwardly therewith to initiate the rewind cycle of the projector in a manner described in above-mentioned U.S. Pat. No. 3,468,498.

A reset lever 243, the operation of which is described in U.S. Pat. 3,468,498 is positioned above cocking arm 84. After the film has been rewound into the cartridge, cocking arm 84 is rotated in a counterclockwise direction about stud 88 by downward movement of the reset lever. Tab 86 engages connector bar 334 and returns cam finger member 291 to its retracted position. Before this operation occurs, trigger lever 38 has presumably been released, allowing latching bar 76 to return to its position shown in FIG. 2. Therefore, as cocking arm 84 encounters the sloped edge surface of tab 82, latching bar 76 is cammed in a counterclockwise direction to allow tab 82 to pass and then return into latching engagement with cocking arm 84 to hold cam finger member 291 in its retracted position.

FIGS. 7–9 show a second embodiment of the latch release mechanism of the present invention for use with a projector having a film gate assembly and rewind mechanism such as shown in U.S. Pat. No. 3,468,498. Referring first to FIG. 7, it will be seen that a film guide member 31' is rigidly attached to the exterior surface of a mechanism plate 19', and a snubber member 32' is attached to the mechanism plate by a pivot pin 33'. The respective lower and upper surfaces of the guide member and snubber member cooperate to define a film guide passageway when the snubber member is pivoted upwardly against the guide member, as illustrated.

A spring 35' bears upwardly against the snubber member to resiliently urge the snubber member to its depicted position adjacent guide member 31'. Thus, as in the first embodiment, during the projection of the film, the snubber member serves to stabilize the tension of the portion of film between the film gate and the supply reel by moving downwardly against the influence of spring 35' in response to momentary increases in such tension. A shoe member 39' extends downwardly from the snubber member above a trigger lever 38'. Trigger lever 38' may be structurally and functionally identical to that shown in U.S. Pat. No. 3,468,498 wherein a full description of the operation of the rewind mechanism can be found.

Referring now to FIG. 8, the film rewinding phase of operation of the projector is initiated when an increase in film tension accompanying withdrawal of all of the available film from the film cartridge moves snubber member 32' in a clockwise direction about pin 33' so that shoe member 39' engages plate 302 to depress trigger lever 38'. To prevent premature rewind, the spring, not shown, urging trigger lever 38' upwardly has a sufficiently large force component to resist depression of the release lever in response to increases in film tension such as are occasionally caused by starting the projector from "still" with heavy reels or pulsations due to out-of-balance reels or film contact with the reel flanges. This increased spring force may prevent actuation of the rewind mechanism when the end of the film is reached. Therefore we have provided a power assist mechanism to depress lever 38' when the end of the film on the roll has been reached.

The power assist mechanism includes a lever member 300 that is also pivotally mounted on the inside surface of plate 19' by pivot pin 33'. Lever member 300 carries a plate 302 extending between shoe member 39' and trigger lever 38'. A leg 304 of lever member 300 carries a leaf spring 306. A latch release member or rack 58' is slidably and rotatably mounted on plate 19' by a pin 60' which rides within a slot 62'. The right end of rack 58' has a bent portion 64' which is aligned with leg 304 of lever member 300. A spring 68' biases rack 58' for movement in rightwardly translational and counterclockwise rotational directions as viewed in FIG. 7. In their relative positions prior to initiation of rewind, as shown in FIG. 7, bent portion 64' of rack 58' bears against spring 306 to rotate lever member 300 about pin 33' until the lever member comes to rest against a stud 307. The upper edge of the left end of rack 58' is provided with teeth 70' positioned for displacement into meshing engagement with a pinion 72'. Spring 68' normally keeps teeth 70' spaced from pinion 72'. Pinion 72' is constantly rotated in a clockwise direction by the projector motor, now shown.

When snubber member 32' is depressed, shoe member 39' engages plate 302 to rotate lever member 300 in a clockwise direction about pin 33', building up tension in spring 306 to act upon bent portion 64' and to depress the right end of rack 58' against the force of spring 68'.

Teeth 70' are lifted into meshing engagement with pinion 72', whereupon movement of rack 58' to the left is initiated. Because the force of spring 35' is low, situations will occur where temporary increases in the film tension cause engagement of gear teeth 70' and pinion 72'. As explained herebefore, adequate lost motion in the system has been provided to effect a time delay between such engagement of the teeth and the pinion and actuation of the rewind cycle to permit disengagement of the mechanism before the projector is placed in its rewind mode if the tension on the snubber is relieved because the signal was temporary and therefore false.

If the film tension is caused by withdrawal of all of the available film from the cartridge, pinion 72' will continue to drive rack 58' until bent portion 64' on the rack engages leg 304 to further rotate lever member 300 in a clockwise direction and to depress trigger lever 38' the additional amount required to actuate the rewind cycle of the projector. It will be noted that the only force required of the film is to depress snubber member 32' against the biasing force of springs 35' and 68' so as to lift rack 58' into engagement with pinion 72'. The pinion is driven by the main projector motor and develops sufficient force to depress trigger lever 38.

The invention has been described in detail with particular reference to preferred embodiments thereof, but it will be understood that variations and modifications can be effected within the spirit and scope of the invention.

We claim:

1. In apparatus having means selectively shiftable between (1) a first condition for transporting a web through an operating station in one direction and (2) a second condition for transporting the web through said operating station in another direction; movable means for shifting said transporting means between its first and second conditions; means biasing said movable means in a direction to shift said transporting means to its second condition; and latch means releasably couplable to said movable means for holding said movable means against the force of said biasing means; the improvement comprising means for releasing said latch means to permit shifting of said transporting means to its second condition, said releasing means including:
    sensing means for detecting a change in the tension of the web;
    means actuatable in response to the detection of an increase in web tension by said sensing means for effecting release of said latch means;
    means for delaying release of said latch means for a predetermined duration of time after actuation of said means for effecting release of said latch means; and
    means responsive to the detection of a decrease in web tension by said sensing means during said predetermined duration of time for deactuating said means for effecting release of said latch means, whereby momentary increases in web tension are ineffective to release said latch means.

2. In apparatus having means selectively shiftable between (1) a first condition for transporting a web through an operating station in one direction and (2) a second condition for transporting the web through said operating station in another direction; movable means for shifting said transporting means between its first and second conditions; means biasing said movable means in a direction to shift said transporting means to its second condition; and latch means releasably couplable to said movable means for holding said movable means against the force of said biasing means; the improvement comprising means for releasing said latch means to permit shifting of said transporting means to its second condition, said releasing means including:
    sensing means for detecting a change in the tension of the web;
    a member movable from a first position toward a second position for effecting release of said latch means;
    means responsive to the detection of an increase in web tension to a predetermined value by said sensing means for initiating movement of said member toward its second position; and
    means responsive to a decrease in web tension from said predetermined value before said member reaches its second position for terminating movement of said member toward its second position and for returning said member to its first position, whereby momentary increase in web tension to said predetermined value are ineffective to release said latch means.

3. In apparatus having means selectively shiftable between (1) a first condition for transporting a web through an operating station in one direction and (2) a second condition for transporting the web through said operating station in another direction; movable means for shifting said transporting means between its first and second conditions; means biasing said movable means in a direction to shift said transporting means to its second condition; and latch means releasably couplable to said movable means for holding said movable means against the force of said biasing means; the improvement comprising means for releasing said latch means to permit shifting of said transporting means to its second condition, said releasing means including:
    sensing means for detecting a change in the tension of the web;
    a member movable from a first position toward a second position for effecting release of said latch means;
    means responsive to the detection of an increase in web tension by said sensing means for initiating movement of said member toward its second position, said means for initiating movement of said member includes (1) a source of mechanical power, and (2) means movable in response to the detection of an increase in web tension by said sensing means for interconnecting said member and said power source whereby said member is moved toward its second position by said power source; and
    means responsive to the detection of a decrease in web tension by said sensing means before said member reaches its second position for terminating movement of said member toward its second position and for returning said member to its first position, whereby momentary increases in web tension are ineffective to release said latch means.

4. The improvement as defined in claim 3 wherein said means for terminating movement of said member comprises spring means for urging said member away from (1) said power source and (2) said second position for disconnecting said member and said power source and for returning said member to its first position upon the detection of a decrease in web tension by said sensing means.

5. In apparatus having means selectively shiftable between (1) a first condition for transporting a web through an operating station in one direction and (2) a second condition for transporting the web through said operating station in another direction; movable means for shifting said transporting means between its first and second conditions; means biasing said movable means in a direction to shift said transporting means to its second condition; and latch means releasably couplable to said movable means for holding said movable means against the force of said biasing means; the improvement comprising means for releasing said latch means to permit shifting of said transporting means to its second condition, said releasing means including:
    sensing means for detecting a change in the tension of the web;
    a source of mechanical power;

a member movable into coupled engagement with said power source in response to the detection of a change in web tension by said sensing means; and means carried by said member for effecting release of said latch means after coupled engagement of said member and said power source, whereupon said transporting means is shifted to its second condition.

6. The improvement as defined in claim 5 wherein said sensing means comprises:

a second member engageable by the web and movable by an increase in web tension;

means lightly biasing said second member against such movement caused by an increase in web tension;

a third member having (1) a first portion contactable by said second member during movement of said second member by an increase in web tension, and (2) a second portion engageable with said first mentioned member for moving said first mentioned member into coupled engagement with said power source when said second member is moved by an increase in web tension.

7. In a motion picture film projector having a housing; means selectively shiftable between (1) a first condition for feeding film from a film supply past an operating station to a film take-up and (2) a second condition for feeding film from the film take-up past the operating station to the film supply; movable means for shifting said film feeding means between its first and second conditions; means biasing said movable means in a direction to shift said film feeding means to its second condition; and latch means releasably couplable to said moving means for holding said movable means against the force of said biasing means; the improvement comprising means for releasing said latch means to permit shifting of said film feeding means to its second condition, said releasing means comprising:

a movable film snubber member mounted on said housing for engagement by the web;

means lightly biasing said snubber member toward the web whereby increases in web tension moves said snubber member against the force of said biasing means;

a power driven gear;

a latch release member mounted on said housing for movement toward said driven gear and said latch means;

a plurality of gear teeth positioned on said release member whereby movement of said release member toward said driven gear causes (1) said gear teeth to mesh with said driven gear and (2) said member to be moved toward said latch member to effect release thereof;

means biasing said release member away from said driven gear and said latch means; and means responsive to movement of said snubber member by an increase in web tension for moving said release member toward said driven gear.

8. The improvement as defined in claim 7 wherein said means for moving said release member comprises a trigger lever having:

a first portion adjacent said snubber member for movement therewith; and a second portion adjacent said release member, whereby movement of said snubber member is transmitted through said trigger lever to said release member.

9. The improvement as defined in claim 7 wherein said latch release member is spaced from said latch means to provide a time delay between meshing of said gear teeth with said driven gear and release of said latch member.

10. In apparatus having means selectively shiftable between (1) a first condition for transporting a web through an operating station in one direction and (2) a second condition for transporting the web through said operating station in another direction; movable means for shifting said transporting means between its first and second conditions; means biasing said movable means in a direction to shift said transporting means to its second condition; latch means releasably couplable to said movable means for holding said movable means against the force of said biasing means; sensing means for detecting a change in the tension of the web; and means actuatable in response to the detection of an increase in web tension by said sensing means for effecting release of said latch means to permit shifting of said transporting means to its second condition; the improvement comprising a power assist mechanism for said releasing means, said power assist mechanism including:

a source of mechanical power;

a member movable into coupled engagement with said power source in response to the detection of a change in web tension by said sensing means; and means carried by said member for assisting said releasing means to release said latch means after coupled engagement of said member and said power source, whereupon said transporting means is shifted to its second condition.

References Cited
UNITED STATES PATENTS

| | | | |
|---|---|---|---|
| 3,240,550 | 3/1966 | Mitchell et al. | 242—189 X |
| 3,468,498 | 9/1969 | Bunting | 242—207 |
| 3,584,943 | 6/1971 | Roman | 352—158 |

GEORGE F. MAUTZ, Primary Examiner

U.S. Cl. X.R.

242—192, 205